HYBRID INTERFACE HAVING REPETITIOUS CHANNEL ADDRESSING

Filed Dec. 6, 1967 5 Sheets-Sheet 1

INVENTOR.
JAY PAUL LANDAUER
WALTER C. TETSCHNER
BY
THEIR ATTORNEY

HYBRID INTERFACE HAVING REPETITIOUS CHANNEL ADDRESSING

Filed Dec. 6, 1967 5 Sheets-Sheet 2

INVENTOR.
JAY PAUL LANDAUER
WALTER C. TETSCHNER
BY
THEIR ATTORNEY

INVENTOR.
JAY PAUL LANDAUER
WALTER C. TETSCHNER
BY
THEIR ATTORNEY

INVENTOR.
JAY PAUL LANDAUER
WALTER C. TETSCHNER
BY
THEIR ATTORNEY

INVENTOR.
JAY PAUL LANDAUER
WALTER C. TETSCHNER
BY
[signature]
THEIR ATTORNEY

United States Patent Office 3,529,297
Patented Sept. 15, 1970

3,529,297
HYBRID INTERFACE HAVING REPETITIOUS CHANNEL ADDRESSING

Jay Paul Landauer, Trenton, and Walter C. Tetschner, Lincroft, N.J., assignors to Electronic Associates, Inc., Long Branch, N.J., a corporation of New Jersey Filed Dec. 6, 1967, Ser. No. 688,472
Int. Cl. G06j *1/00;* H03k *13/254;* H04j *3/00*
U.S. Cl. 340—172.5 2 Claims

ABSTRACT OF THE DISCLOSURE

A hybrid-digital/analog computing system is provided with an interface unit adapted for the transfer of large amounts of data to or from a finite number of analog channels on the execution of but a single data transfer instruction which specifies the first analog channel to be accessed or sampled and the last analog channel to be accessed or sampled in the sequential order with the interface unit including means to increment the address of the first channel upon the transfer of a data segment to provide the address of the second of a sequence of channels and so on, until the updated channel address compares with that of the last channel specified whereupon the interface unit again accesses the first channel with the cycle being repeated until all of the data specified by the instruction has been transferred. The time at which each data value is transferred may be controlled by a signal from the programmed logic section of the analog system.

This invention relates to a hybrid computer interface and more particularly to such a hybrid interface adapted for the sequential addressing of a plurality of analog channels in a repetitious manner.

The development of present day computational systems has experienced an emphasis on the capability of the system to respond to and communicate with elements outside of the system on what is commonly referred to as a "real time" basis. Such communication has found application not only between two different systems where the computation being carried on by one system is dependent upon the results of the computation in the other system, but also between a particular system and its user or operator. In this latter case, the operator may receive certain results from the system by way of a display console or terminal including a cathode ray tube upon the face of which is displayed alphanumeric data and also information in graphic form. A particular example of communication between two different systems is that of the hybrid computer which employs both a digital system and an analog system with the communication being by way of an interface linkage between the two systems.

In the case of a digital system having a display terminal for the display of graphic information, there is a requirement that certain types of digital data signals, which are of a binary or true-false nature, be repeatably converted to analog signals corresponding to related information for proper display of the graphic information on the face of the cathode ray tube. There may be a similar requirement for analog to digital conversion as well as digital to analog conversion between the digital and analog portions of a hybrid computing system. In the hybrid computer system as well as in the situation of a digital system communicating with a graphic display terminal, the transfer of information is under the control of a set of program instructions being executed by the digital system. As the nature of the information being communicated becomes more complex, the number of program instructions required to control the transfer of such information becomes increasingly greater and there is a need to be able to transfer such complex information across the interface with a minimum number of instruction executions being required. In the situation of a digital computer communicating with a graphic display terminal, the data transfer and conversion and the problems associated therewith may be of the same nature as that encountered in a hybrid computer system.

In a hybrid computer system, the purpose of the analog computer is to simulate particular conditions to be satisfied which simulation is accomplished with electrical circuits representing an analogy of these conditions. The digital computer in a system, on the other hand, serves to provide sequential control according to a given program of the operation of the analog computation which may be complex and require a plurality of iterative steps. The digital computer also provides large storage capabilities to store various functions required for the analog computation as well as to provide for diagnostic routines and ancillary computations which require a high degree of accuracy for slowly changing variables. In the operation of the hybrid system under the control of the digital program, the digital system communicates across the hybrid interface to select the particular operational modes of the analog system, to select and provide appropriate resistive values of the potentiometers representing the coefficients of the particular equations involved as well as to supply the initial condition values with which the computation is to start. When the analog computation has been partially completed, it is required to communicate, to the digital system, values of the resultant computation and to receive new instructions and related information with which it proceeds to perform additional analog computation. The control information is normally presented across a separate interface to the control section of the analog computer. However, the timing of the presentation of such control information must be coordinated with the computations being carried out by the analog portion of the system and the computational results communicated back to the digital portion of the system by way of a data interface.

The sampling of analog values for conversion to digital values to be transferred across the interface to the memory unit is accomplished in response to the execution of program instructions as is the transfer and conversion of digital values to analog values. A particular instruction may be employed to select a sample-hold amplifier connected to a particular analog signal source and to place that amplifier in a hold condition to store the sampled voltage for subsequent conversion to digital signals to be transferred to the memory of the digital system. Similarly, a particular instruction may be employed to select particular digital to analog converters and thus particular analog channels. In addition to the control interface, the analog computer may communicate with the digital portion of the system by way of separate system interface in addition to the normal data channel by which the digital computer is connected to other peripheral devices through a standard input-output control unit. Thus, sufficient data paths may be provided to allow for any data rate of communication between the digital and analog portions of the system as required. However, the advantages of such a plurality of data paths are defeated when there is a program execution delay due to a large number of instructions being required for the analog to digital conversion or the digital to analog conversion and transfer of data values.

A particular complex situation in analog-digital hybrid computation results when a large amount of data is required to be transferred to or from the analog element of the system, which data nevertheless represents a finite number of values which are continuously varying. For example, in either the situation of hybrid computation or in the situation of data readout to a graphic display unit, the data to be transferred may represent only a small number of different variables, which variables nevertheless must be continuously updated to or from a large block of memory in the digital system. Another requirement in such a situation is that the data transfer must be performed in a particular timing sequence to be synchronous with the analog computation or to establish the appropriate intensity of each point for display. In prior art systems, a large number of program instructions would be required to be executed by the digital portion of the system in order to achieve this data transfer. Not only does the large number of instruction executions present a time delay in the operation of the entire system, but also requires additional time for the writing of the program for that situation. It is then desirable to be able to provide for the transfer of large amounts of data on a few conversion channels at specific time intervals with the execution of a minimum number of instructions.

Thus, it is an object of the present invention to provide an improved interface for an analog-digital or hydrid computer system with an increased data conversion rate and reduced digital computer execution time.

It is another object of the present invention to provide an improved hybrid computer system wherein particular analog to digital and digital to analog conversion and transfer of data may be achieved with a minimum number of program instructions.

There is still another object of the present invention to provide an improved interface for an analog-digital hybrid computer system to transfer a relatively large amount of data to or from a finite number of elements.

In the situation of the hybrid analog-digital computer system as well as in the case of a digital computer communicating with a peripheral device requiring voltage signals of absolute magnitude, data transfer to or from a plurality of different analog channels required the execution of separate instructions by the digital computer with at least one such instruction execution being required for a data transfer to each analog channel. Thus, while a large number of data units could be transferred to a separate channel upon the execution of a single transfer instruction, an unproportional number of such instruction executions would be required for the transfer of large numbers of data segments to or from a plurality of such channels when the data transfer to the respective channels or devices is to be interleaved or multiplexed. While it is well known that prior art input-output systems for computer systems are adapted for bulk transfer of data to or from a particular I/O device by a single "instruction execution" which specifies either an initial data segment location and a count of the number of segments to be transferred or an initial data location in memory and the final data location in memory, such systems nevertheless require a separate instruction execution for data transfer to or from each separate device.

With the present invention, large amounts of data units may be transferred to or from a plurality of analog channels upon the execution of but a single data transfer instruction which specifies, among other things, the first analog channel to be accessed or sampled and the last analog channel to be accessed or sampled in a sequential order and the interface between the digital and analog portions of the system is provided with means to increment the address of the first channel upon the transfer of a data segment to provide the address of the second of a sequence of channels and so on until the updated channel address compares with that of the last channel specified by the instruction. When such a comparison is achieved, the interface unit again accesses the first channel specified by the executed instruction and the cycle is repeated until all the data specified by the instruction has been transferred, a data segment being transferred each time the previous channel address is incremented to achieve a new channel address. In this manner, blocks or prearranged data units may be transferred to or received from a plurality of analog channels by a digital system in response to the execution of but a single instruction by a digital system.

A feature then in the present invention resides in an analog-digital interface unit adapted to select individual analog channels coupled thereto in response to sets of digital signals representing the address of a first analog channel to be selected and the last analog channel to be selected in a sequential order, the interface unit being further adapted to increment the first address after each of a plurality of data transfers and conversions until the incremented address compares with that of the last channel address specified by the data transfer instruction whereupon the first address channel is again selected with the cycle being repeated until the required amount of data has been transferred to or from each of the analog channels specified.

These and other objects, advantages and features of the present invention will become more readily apparent from a review of the following specification when taken in conjunction with the drawings wherein.

Figure 1:
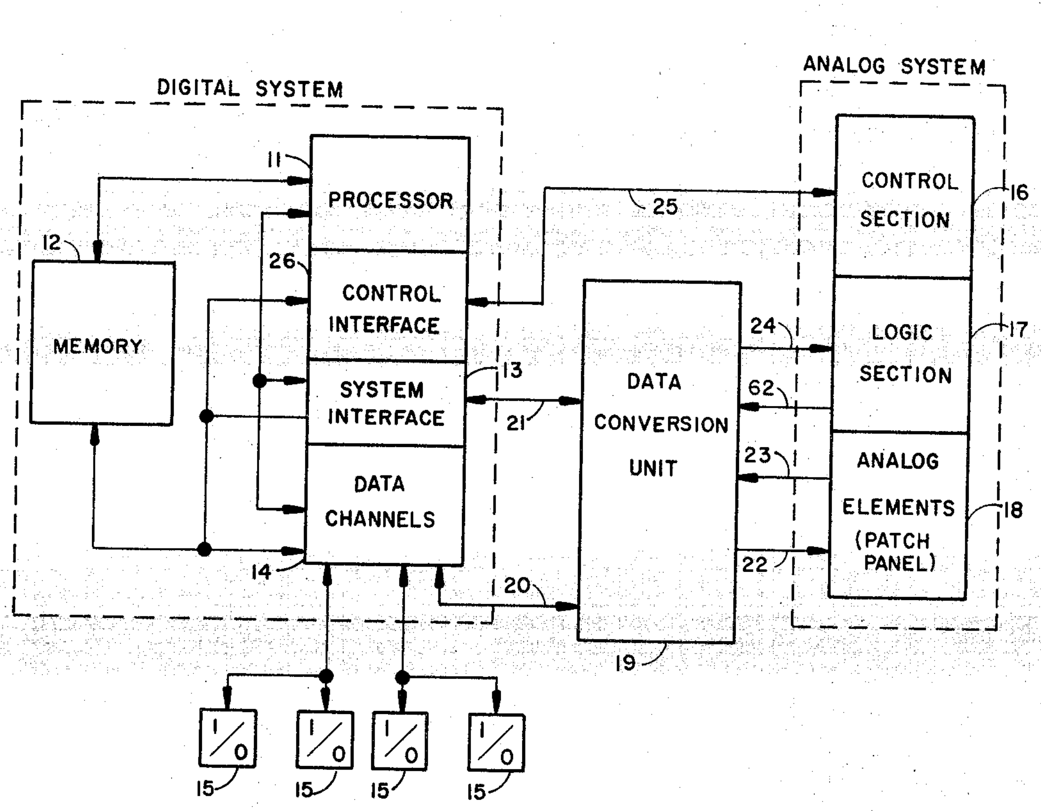
FIG. 1 is a diagrammatic illustration of a general hybrid system in which the present invention resides.

Since the present invention pertains to program control of communication across a hybrid interface, reference is first made to FIG. 1 which illustrates the general organization of a hybrid computing system. The digital system is of a type known in the art and comprises processor 11 that includes an instruction sequencing control unit, an arithmetic unit, and so forth. Instructions and data are supplied to processor 11 from memory 12 which stores such data and other information until needed for subsequent computations. This information and data have been transferred to memory 12 from one or more peripheral devices 15 by way of data channel 14 pursuant to a control word format which transfer may be in a manner interleaved with communications between processor 11 and 12 as will be understood by one skilled in the art. System interface 13 is provided primarily to control communication between memory 12 and the analog portion of the system and is preferably of the direct data channel type having the highest priority in memory accessing.

The analog system, as indicated in FIG. 1, includes analog element 18 that comprises the operational amplifiers and other analog computing elements, logic panel 17 that is adapted to provide elementary sequencing and other logic functions for the particular analog computations and control panel 16 which controls the various operational modes of the analog system in accordance with instructions executed by the digital system. Control panel 16 is in communication with control interface 26 by way of control interface bus 25. However, analog input values and related function information are transferred between the analog system and the digital system by way of data conversion unit 19. As illustrated in FIG. 1, the information transfer may be directly to or from memory 12 by way of system interface 13 or may be transferred by way of data channel 14 in a normal manner in which information is transferred to or from memory 12 and other peripheral devices 15. Communication with the analog elements 18 is accomplished via busses 22 and 23. Bus 22 presents information in analog form to the analog elements while bus 23 presents analog information to conversion means.

Figure 2:
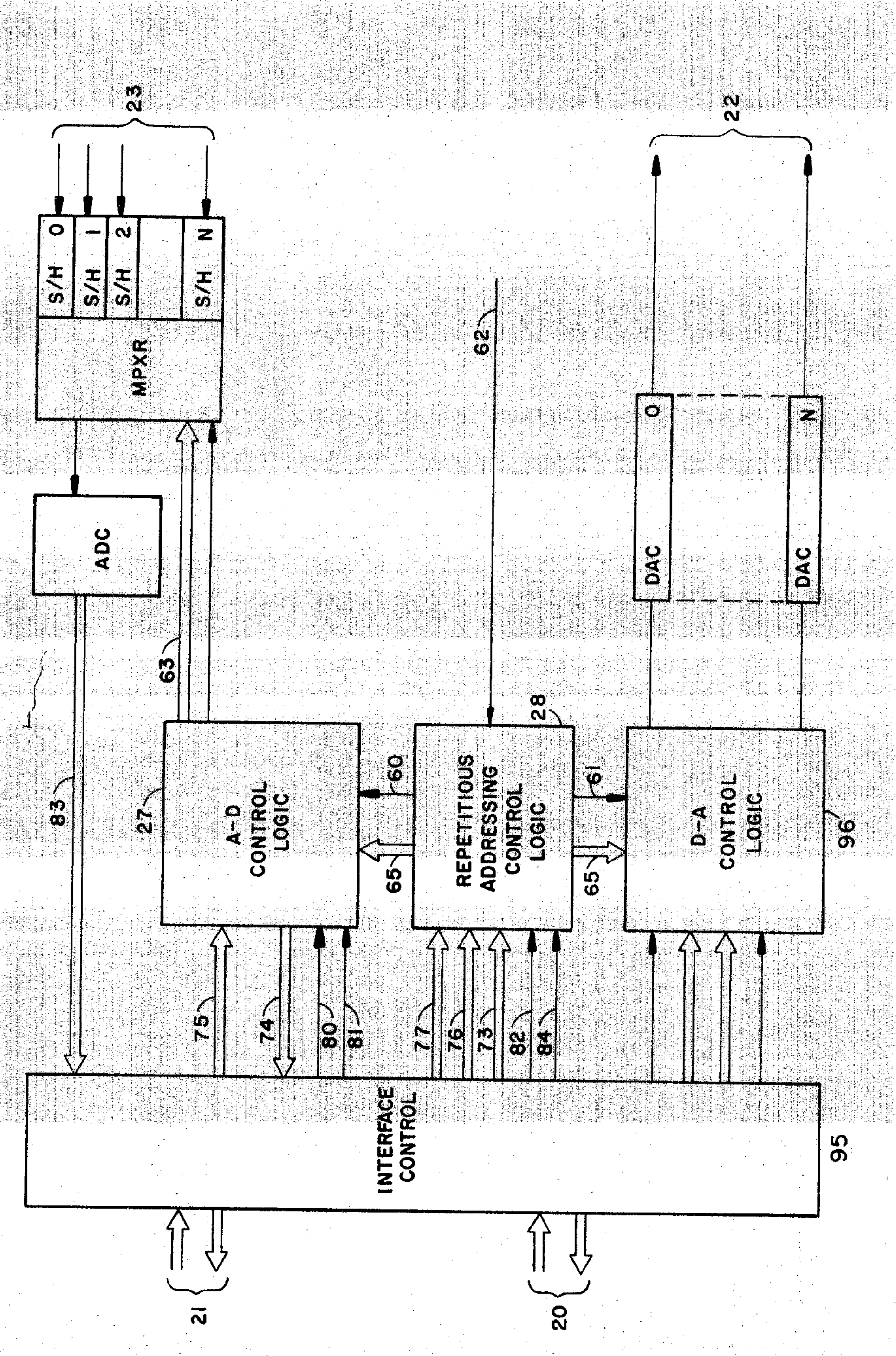
FIG. 2 is a representation of a data conversion unit of a type embodying the present invention.

The general organization of data conversion unit 19 is illustrated in FIG. 2 and includes the digital to analog converters and an analog to digital converter as well as four different control units: interface control 95 that serves to receive and decode instructions from the digital system, digital to analog control 96 that includes the address and command registers to select the various digital to analog converters, analog to digital control 27 that includes the address and command registers to select the respective analog to digital conversion channels and the repetitious addressing control logic 28 which is the essential element of the present invention. More particularly, bus 75 provides an address for the multiplexor address register 54 shown in FIG. 6. Bus 74 enables storage in the memory of the last multiplexor address in the event of an interrupt so that the multiplexing operations may be continued after the interrupt sequence is executed. Line 80 controls the inputting of the address on bus 75 to the multiplexor register 54. Lead 81 increments the address provided on bus 75.

Figure 4:
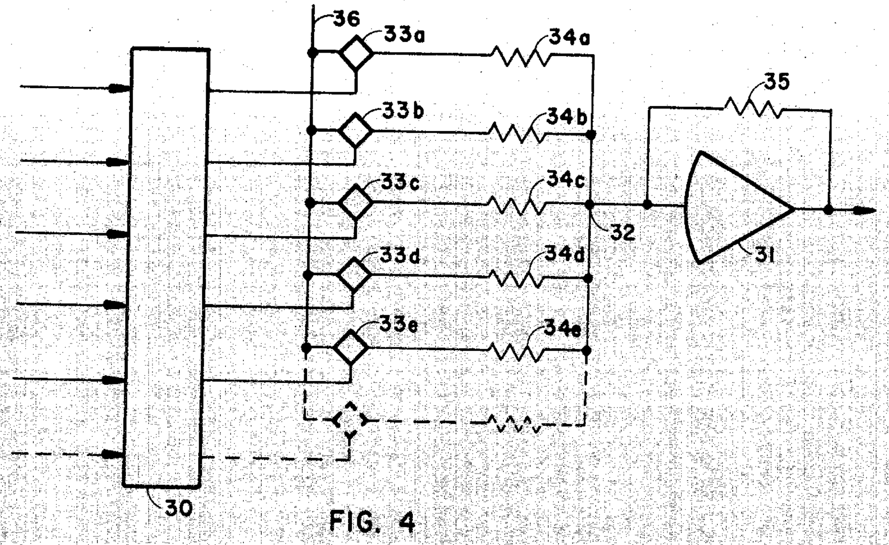
FIG. 4 is a schematic diagram of a digital to analog converter of the type employed with the present invention.

Before describing the functions of the various control circuits of data conversion unit 19, a better understanding of these functions will be achieved from a brief description of sample-hold amplifiers and the respective digital to analog and analog to digital converters employed by the conversion system. Referring first to FIG. 4, there is shown therein a simplified diagram of a typical digital to analog converter that includes register 30 which is adapted to receive the digital signals representative of the value to be converted to analog form. The output leads of the respective positions of register 30 are in turn coupled to gates 33*a* . . . 33*e* which, when conductive, place the corresponding resistors 34*a* . . . 34*e* in circuit connection with reference voltage 36 and summing junction 32 in the input circuit to operational amplifier 31. The value of each of the resistances 34*a* . . . 34*c* is so chosen in relation to feedback resistor 35 and the value of reference voltage 36 so as to contribute an appropriate unit of current to summing junction 32 to provide an increment of output voltage from amplifier 31 corresponding to the respective bit position of register 30. That is to say, when gate 33*a* is placed in conductance, there will result an output voltage increment proportional to one volt. When gate 33*b* is placed in conductance, an output voltage increment will be obtained which will be proportional to two volts and so on. It will be understood that each voltage increment will correspond to the particular significant bit position of the digital signal held in register 30. Upon presentation of the respective digital signals to register 30, an analog voltage signal will immediately be generated which will be proportional to the numerical value of the digital signals.

Figure 5:
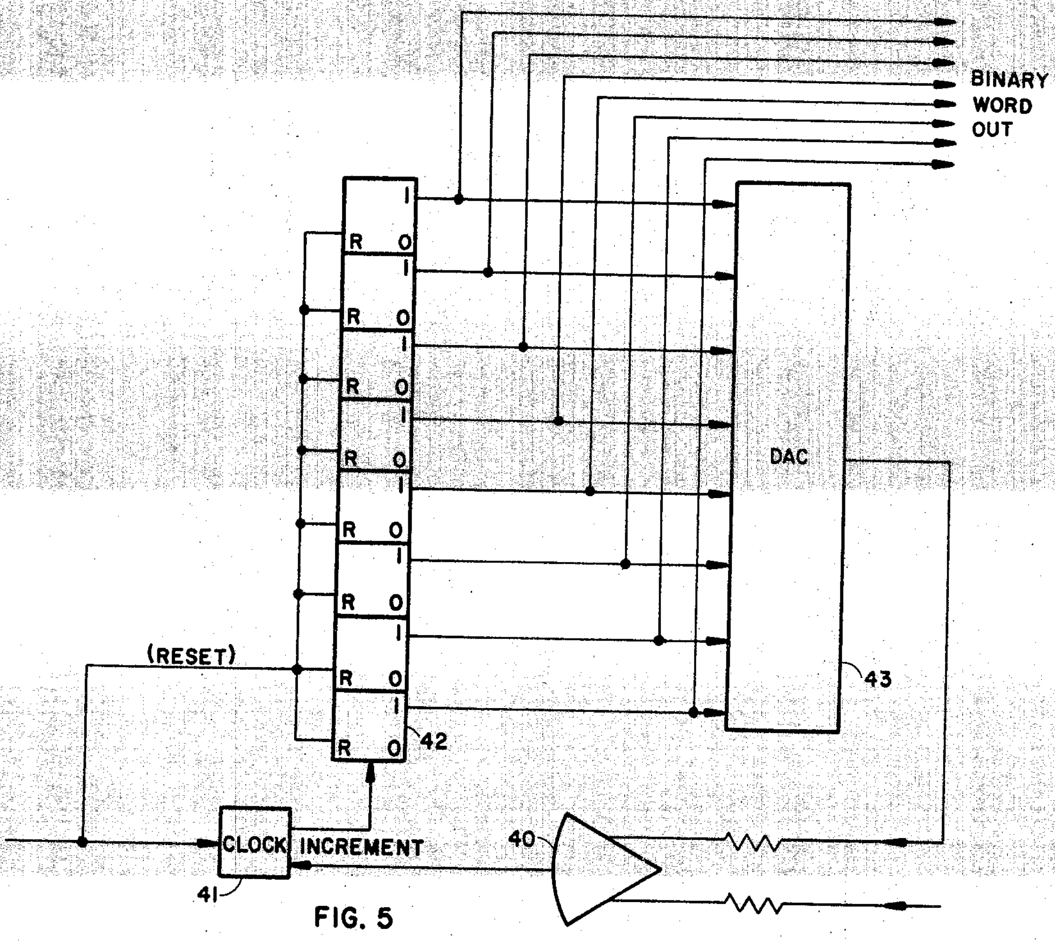
FIG. 5 is a schematic diagram of an analog to digital converter of the type that may be employed with the present invention.

While the digital to analog converted provides almost instantaneous conversion of digital signals to an analog signal, a relatively greater period of time is required for the conversion of an analog signal to digital signal as will be best understood from a description of FIG. 5 which illustrates a typical analog to digital converter. The analog signal to be converted is presented to voltage comparator 40 at the beginning of the conversion cycle, at which time, clock 41 is started to increment counter register 42. Counter 42 was reset at the start of the cycle with all of its bit positions being zero and after each incrementation, the digital values of the respective bit positions are presented to digital to analog converter 43, the analog output of which is supplied to voltage comparator 40. The process is repeated until the analog output signal from digital to analog converter 43 is equal or approximately equal to the analog signal to be converted and when this comparison occurs there is a zero output voltage presented from the comparator to clock 41 to stop the incrementation and the digital values of counter 42 are then read out in digital form corresponding to the value of the analog input signal.

Figure 6:
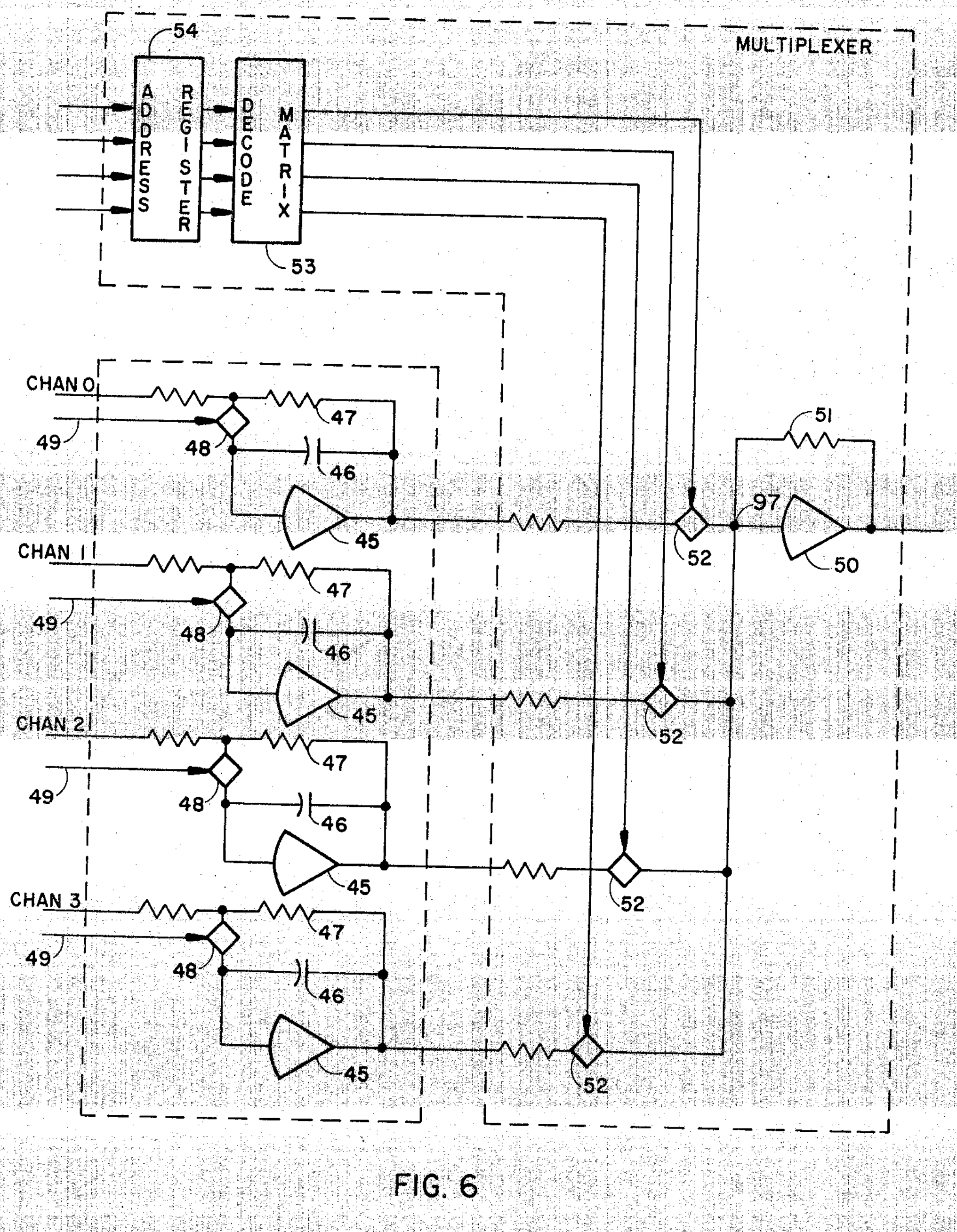
FIG. 6 is a schematic diagram of a plurality of sample-hold amplifiers of the type that may be employed with the present invention and a multiplexing unit therefor.

The manner in which the various analog signals are stored so that they may be multiplexed or sequentially presented to the analog to digital converter will now be described with reference to FIG. 6. A plurality of sample-hold amplifiers are each comprised of operational amplifier 45 having a resistor 47 and a capacitor 46 placed in parallel feedback path relation between the input and output terminals in the amplifier. Electrical gate 48 is placed in the input path of amplifier 45 so as to disconnect the amplifier from the analog channel and to remove resistor 47 from its feedback path relation. The amplifier is in a tracking mode when gate 48 is conducting and the output signal will be just equal to the input signal except that it has been inverted. When the amplifier is in the tracking mode, the voltage drop across capacitor 46 will be directly proportional to the signal being tracked. When gate 48 ceases to conduct because of the removal of a control signal thereto, the amplifier is placed in the hold mode by being disconnected from the analog input channel so that the output voltage presented from the amplifier will just be that voltage which was across capacitor 46 at the time when the amplifier was placed in the hold position. As illustrated in FIG. 6, each of the output signals from the respective sample-hold amplifiers are connected to suming junction 97 of amplifier 50. Because of resistor 51 having been placed in the feedback path of amplifier 50, this amplifier merely serves as an inverter to correct the inversion of the signal by the respective sample-hold amplifiers 45. The output lead of each of amplifiers 45 is coupled to summing junction 97 by way of a plurality of electrical gates 52, each of which may be placed in conductance by appropriate signals being supplied to decode matrix 53. When an individual sample-hold amplifier is to be chosen for connection to the analog to digital converter, signals representing the address of this amplifier are supplied to the decode matrix 53 from address register 54. Each time a new address is presented to register 54 (in a manner to be described below) a new channel will be selected for connection to the analog to digital converter.

Having described the various analog to digital and digital to analog converters, and the manner in which they are connected between the various analog channels and the digital busses, the present invention by which such analog channels can be repetitiously addressed will now be described. The requirement for such repetitious addressing may depend upon the particular problem being simulated by the analog and digital computers which are interconnected by way of the hybrid interface of the present invention. For example, the program being run by the digital portion of the system may require the periodic scanning of a number of particular analog variables representing the problem being simulated by the analog portion of the system. Since these variables may be constantly changing, the program may call for sampling of such variables in order after which sampling is to be repeated with each analog variable being converted to digital form for transfer to the memory of the digital system upon each sampling.

Figure 3:
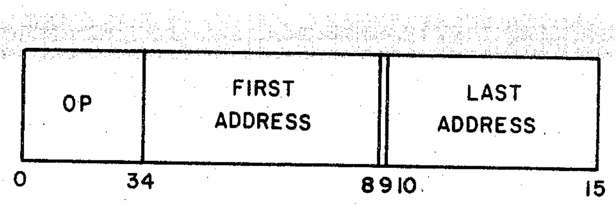
FIG. 3 is a representation of instruction word formats of the type employed with the present invention.

To initiate a data transfer to or from a plurality of analog channels, through the data channels 14 of FIG. 1, processor 11 executes an appropriate input/output transfer instruction that selects the location in memory 12 in which data channel control parameters are stored. The data channel control parameters include the starting location of the block of memory 12 to or from which data will be transferred, the size of the block of data, and a special linkage interface device instruction which is to be sent to data conversion unit 19. This latter device instruction will have a format of the type illustrated in FIG. 3 and is preferred to comprise 16 bits of information. As illustrated in FIG. 3, the first four bits (0–3) constitute the op code that informs data conversion unit 19 whether the data is to be transferred from the analog system or to the analog system, among other things. Bit positions 4–8 in turn specify the address of the first channel of the plurality of channels to be updated and bit positions 10–15 contain the address of the last channel of the group to be updated.

The device instruction is transferred to data conversion unit 19 either by way of system interface 13 or data channels 14, depending upon whether the requisite data transfer is to be a record or burst-type mode or in a multiplex mode as was described in relation to FIG. 1. As illustrated in FIG. 2, the data channel device instruction is received by interface control 95 and transferred to the repetitious addressing control logic 28 which is illustrated in more detail in FIG. 7. As shown therein, the contents of the first address field are received over bus 76 by first address register 85 and the contents of the last address field are received over bus 73 by last address register 86. The contents of the op code are received on bus 77 into the operation decoder register 64. The respective registers are conditioned to receive these address fields in response to a signal transmitted from the interface control 95 by way of conductor 82 as indicated in FIG. 2.

Referring again to FIG. 7, the contents of first address register 85 are transferred over bus 89 to the address incrementor 87 which is a register adapted to increment its contents by one unit in response to an appropriate signal as will be understood by one skilled in the art. The contents of last address register 86 are continuously supplied over bus 90 to comparator 88 which supplies a signal to AND gate 91 so long as the contents of last address register 86 do not compare with the contents of address incrementor 87.

Figure 7:
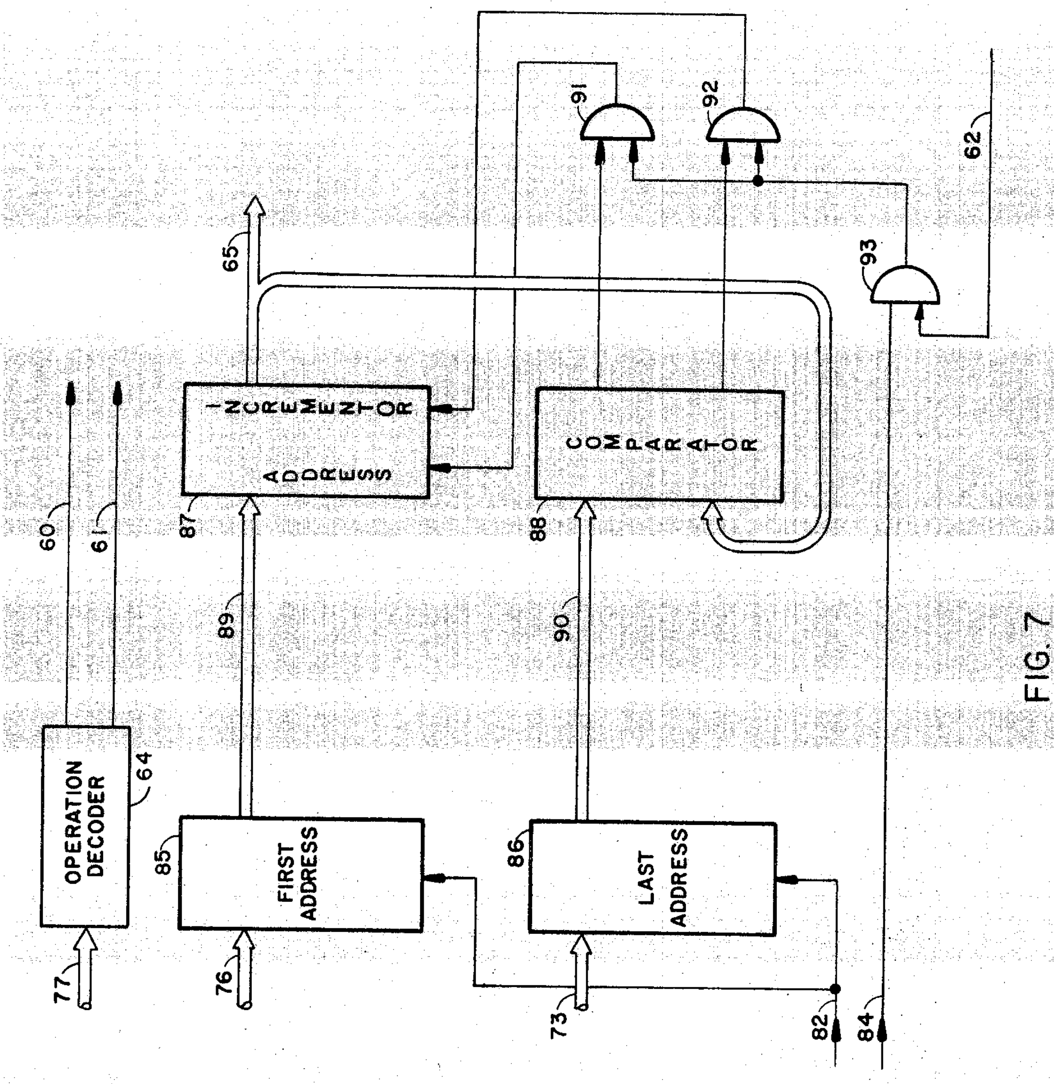
FIG. 7 is a representation of the conversion and amplifier controls unit employing the present invention and including the addressing means of the present invention.

At the time address incrementor 87 receives contents of first address register 85, it also presents this address over bus 65 to the A–D control logic 27 and the D–A control logic 96. This first address will be transferred into the respective channel selection registers depending upon the state of conductors 60 and 61 which were set by the op-code portion of the device instruction. For example, if an analog-to-digital transfer was indicated, conductor 60 will cause bus 65 to transfer the first address through the A–D control logic 27 to bus 63 which goes to the address register 54 of the multiplexer as illustrated in FIG. 6. The address register 54 is decoded by the decode matrix 53 to select the appropriate channel as indicated in FIG. 6 and described above in relation thereto. When the signal on the appropriate analog channel has been converted to a set of digital signals by the analog to digital converter as indicated in FIG. 2, these signals are transferred over bus 83 to interface control 95 for transfer to the digital portion of the hybrid system over the interface bus 20. Each time a set of such digital signals have been thus transferred, a signal is transmitted back from interface control 95 to the control logic 28 by way of conductor 84 to AND gate 93 as illustrated in FIG. 7. Conductor 62 provides for synchronizing each data transfer operation to or from the analog system by means of a signal from the logic section 17 as shown in FIG. 1. When an appropriate signal is transmitted on conductor 62, AND gate 93 will produce an output signal. There having been no comparison between contents of address incrementor 87 and last address register 86, an output signal is also produced by AND gate 91 which causes the address incrementor 87 to increment its contents by one, which incremented contents are then supplied over bus 65 to the multiplexor to select a new channel. This process is repeated until the incremented address compares with the contents of last address register 86, at which time the comparator supplies a signal to AND gate 92 such that when a transfer signal is received over conductor 86, AND gate 92 will produce the signal that conditions address incrementor 87 to again accept the contents of first address register 85.

With the system thus described, the digital portion of the hybrid system can select any group of analog channels for sequential scanning and data transfer under timing control from the analog system so long as the number of channels selected are within the limits of the addressing field. When the processor of the digital system has executed a data channel transfer command, a device instruction is sent to the data conversion unit of the hybrid interface which instruction specifies the first address or address of the first channel to be selected, the last address or address of the last channel to be selected, and the type of data transfer operation to be performed. For analog to digital data transfer, the first address is employed to select the corresponding analog channel, which address is then incremented for the selection of the next adjacent channel upon the completion of the analog to digital conversion and transfer of the resultant digital signals from the previous channel. The process is repeated until the last channel to be addressed has been selected after which the system returns to the first addressed channel and the sequence is repeated until the total number of data segments required by the initial command have been transferred to the digital portion of the system. This total number will be specified as a parameter by the initial I/O command executed by the processor of the digital system as will be understood by one skilled in the art.

While the description thus far has been primarily concerned with the selection of particular analog channels, for analog to digital conversion and transfer of the resultant digital signals to the memory of the digital portion of the system, it will be understood that the present invention is also adaptable for the transfer of digital signals from the memory of the digital portion of the system for digital to analog conversion to particular analog channels in a sequential and repetitious fashion. For example, the analog portion of the hybrid system may be set up for the generation of the solution to a particular differential equation where it is required to generate new solutions to the equation with a new set of coefficients being supplied for each solution.

Another example of where the present invention may be employed is that where the analog portion of the system includes a graphic display terminal wherein significance is attached to particular points displayed on the face of the cathode ray tube. Such points will be displayed in a particular graphic array in accordance with voltages supplied to the grids of the cathode ray tube. Which voltages may be required to vary so as to vary the graphic array. With the employment of the present invention, such veriation will be controlled by the digital portion of the system by supplying data for conversion to analog voltages to particular analog channels representing the points to be displayed, the particular channels being selected in a sequential and repetitious manner in accordance with the present invention.

While the various circuits of the logic and control units as well as the particular registers have not been described, it is believed that such circuits can be fabricated by persons skilled in the art and such registers as well as the gating circuits associated therewith are well known to persons skilled in the art. Furthermore, it will be understood that only particular embodiments of the present invention have been described and variations and modifications of these embodiments will occur to persons skilled in the art, which variations and modifications will nevertheless be within the scope of the invention as claimed.

What is claimed is:

1. In a hybrid computing system, a conversion unit coupled between a digital system and an analog system, said conversion unit comprising:

a plurality of analog signal channels coupled to said analog system;

a first source of a set of digital signals representative of a first of said analog channels to be addressed;

a second source of a set of diigtal signals representative of a last of said analog channels of a sequence of said channels to be addressed; and addressing means coupled to said first and second sources and to said channels to select a particular channel in response to a set of digital signals;

said addressing means including means to receive a set of digital signals from said first source and to initially select said first channel;

means connected to said receiving means to update said receiving means to select another channel having the next highest numerical address to the address of the initially selected channel;

comparison means connected to said receiving means and to said second signal source to compare said receiving means updated signals with said set of signals from said second signal source including means for activating said updating means when said signals do not compare; and means connected to said comparison means, and to said receiving means for repeating said first channel selection and said receiving means updating when said signals compare.

2. A conversion unit according to claim 1 further including a plurality of sample-hold amplifiers, each of which is connected to a respective analog signal channel, and an analog to digital converter sequentially connected to each of said sample-hold amplifiers upon the selection thereof of said respective channels.

References Cited

UNITED STATES PATENTS

| | | | |
|---|---|---|---|
| 3,247,487 | 4/1966 | Strong et al. ------ | 340—172.5 |
| 3,344,407 | 9/1967 | Koeijmans -------- | 340—172.5 |
| 3,344,410 | 9/1967 | Collins et al. ------ | 340—172.5 |
| 3,345,608 | 10/1967 | Brown et al. ------ | 340—172.5 |

PAUL J. HENON, Primary Examiner

H. E. SPRINGBORN, Assistant Examiner